(12) United States Patent
Tomescu et al.

(10) Patent No.: US 11,542,845 B2
(45) Date of Patent: Jan. 3, 2023

(54) AIRCRAFT ENGINE LUBRICATION SYSTEM AND METHOD

(71) Applicant: PRATT & WHITNEY CANADA CORP., Longueuil (CA)

(72) Inventors: Dana Tomescu, Brampton (CA); Daniel Alecu, Brampton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 668 days.

(21) Appl. No.: 16/674,647

(22) Filed: Nov. 5, 2019

(65) Prior Publication Data

US 2021/0131321 A1 May 6, 2021

(51) Int. Cl.
| | |
|---|---|
| *F01M 11/04* | (2006.01) |
| *F01D 25/20* | (2006.01) |
| *F01M 11/02* | (2006.01) |
| *F01M 1/02* | (2006.01) |
| *B64D 33/00* | (2006.01) |
| *F02C 7/06* | (2006.01) |
| *F01M 1/20* | (2006.01) |
| *F01M 11/00* | (2006.01) |
| *B64D 27/10* | (2006.01) |

(52) U.S. Cl.
CPC ......... *F01M 11/0458* (2013.01); *B64D 33/00* (2013.01); *F01D 25/20* (2013.01); *F01M 1/02* (2013.01); *F01M 1/20* (2013.01); *F01M 11/02* (2013.01); *F02C 7/06* (2013.01); *B64D 27/10* (2013.01); *F01M 2011/0095* (2013.01); *F01M 2011/0466* (2013.01); *F05D 2220/323* (2013.01); *F05D 2270/11* (2013.01)

(58) Field of Classification Search
CPC . F01M 1/02; F01M 1/20; F01M 11/02; B64D 33/00; F01D 25/20
USPC ......................................................... 184/6.11
See application file for complete search history.

(56) References Cited

U.S. PATENT DOCUMENTS

| | | | |
|---|---|---|---|
| 4,012,012 A | 3/1977 | Ligler | |
| 4,888,947 A | 12/1989 | Thompson | |
| 8,020,665 B2 | 9/2011 | Sheridan et al. | |
| 2014/0069743 A1* | 3/2014 | Xu | F01D 25/18 184/6.11 |
| 2020/0392866 A1* | 12/2020 | Younes | F01D 25/20 |

FOREIGN PATENT DOCUMENTS

WO 2019122658 A1 6/2019

* cited by examiner

*Primary Examiner* — Michael R Mansen
*Assistant Examiner* — Mark K Buse
(74) *Attorney, Agent, or Firm* — Norton Rose Fulbright Canada LLP.

(57) ABSTRACT

A lubrication system for an aircraft engine includes an engine lubricant tank including at least a supply port hydraulically connectable to the aircraft engine, a lubricant makeup port, and an overfill port, an auxiliary lubricant tank, a lubricant makeup conduit hydraulically connecting the auxiliary lubricant tank to the lubricant makeup port. The lubricant makeup conduit includes a pump operable to move lubricant from the auxiliary lubricant tank to the lubricant makeup port, and an overfill conduit hydraulically connecting the overfill port to the auxiliary lubricant tank. A method of operating a lubrication system of an aircraft engine of an aircraft is also disclosed.

20 Claims, 2 Drawing Sheets

AIRCRAFT ENGINE LUBRICATION SYSTEM AND METHOD

TECHNICAL FIELD

The application relates to aircraft engine lubrication systems and methods.

BACKGROUND

Prior art aircraft engine oil systems are suitable for their intended purposes, but may have drawbacks in certain circumstances. For example, prior art engine oil tanks may be refilled only while on ground using manual human measurement to avoid overfilling or insufficiently filling the engine oil tank. Excessive oil supply above the maximum engine oil tank level may induce accelerated wear to engine shaft seals, while insufficient oil supply may result in low oil pressure. Another reason why prior art systems are refilled only on the ground is that the effective oil level in the engine oil tank varies with varying aircraft attitude and oil temperature. Accordingly, there are typically procedures for the ground crew to follow when refilling prior art oil systems on the tarmac, the procedures including specifications of the tarmac inclination and oil temperature at the time of the oil level check and refill. Thus, improvements to prior art technology could be made.

SUMMARY

In one aspect, the present technology provides a lubrication system for an aircraft engine, comprising: an engine lubricant tank including at least a supply port hydraulically connectable to the aircraft engine, a lubricant makeup port, and an overfill port; an auxiliary lubricant tank; a lubricant makeup conduit hydraulically connecting the auxiliary lubricant tank to the lubricant makeup port, the lubricant makeup conduit including a pump operable to move lubricant from the auxiliary lubricant tank to the lubricant makeup port; and an overfill conduit hydraulically connecting the overfill port to the auxiliary lubricant tank.

In some embodiments, the supply port is in the bottom of the engine lubricant tank.

In some embodiments, the lubricant makeup port is in at least one of: the bottom of the engine lubricant tank, and a top of the engine lubricant tank.

In some embodiments, the lubricant makeup port is in the bottom and further comprising a check valve in the lubricant makeup conduit, the check valve oriented to allow lubricant flow through the check valve toward the lubricant makeup port and to prevent lubricant flow from the lubricant makeup port past the check valve.

In some embodiments, the auxiliary lubricant tank includes at least one of: a pressure relief valve, and a vacuum relief valve.

In some embodiments, the pump is a lubricant makeup pump and the overfill conduit includes a scavenge pump operable to move lubricant from the overfill port to the auxiliary lubricant tank via the overfill conduit.

In some embodiments, the scavenge pump is configured to operate at a higher liquid lubricant flowrate than the lubricant makeup pump.

In some embodiments, the lubricant makeup pump is operatively connected to a motor and the scavenge pump is operatively connected to the common motor, the motor drivable to simultaneously operate both the lubricant makeup pump and the scavenge pump.

In some embodiments, the lubricant makeup pump is a first fixed displacement pump and the scavenge pump is a second fixed displacement pump.

In some embodiments, the engine lubricant tank has a design lubricant level and the overfill port is disposed at the design lubricant level.

In another aspect, the present technology provides an aircraft, comprising: an aircraft engine connected to the aircraft; and a lubrication system operatively connected to the aircraft engine to lubricate parts of the aircraft engine, the lubrication system including: an engine lubricant tank hydraulically connected to the aircraft engine; an auxiliary lubricant tank, a lubricant makeup conduit hydraulically connecting the auxiliary lubricant tank to the engine lubricant tank, the lubricant makeup conduit including a pump operable to move lubricant from the auxiliary lubricant tank to the engine lubricant tank via the lubricant makeup conduit, and an overfill conduit hydraulically connecting the engine lubricant tank to the auxiliary lubricant tank.

In some embodiments, the pump is operable to move a quantity of lubricant from the auxiliary lubricant tank to the engine lubricant tank over a time period during flight, the quantity being at least equal to a maximum expected quantity of lubricant to be consumed by the aircraft engine over the time period.

In some embodiments, the aircraft includes a controller operatively connected to the pump and configured to operate the pump during flight.

In some embodiments, the engine lubricant tank has a design lubricant level and the overfill port is disposed at the design lubricant level.

In some embodiments, the pump is a fixed displacement first pump; the overfill conduit includes a fixed displacement second pump operable to move lubricant from the overfill port to the auxiliary lubricant tank via the overfill conduit.

In some embodiments, the second pump configured to operate at a higher liquid lubricant flowrate than the first pump, and the first and second pumps are configured to operate at least intermittently during flight of the aircraft.

In some embodiments, at least one of the engine lubricant tank and the auxiliary lubricant tank includes a filling port.

In yet another aspect, the present technology provides a method of operating a lubrication system of an aircraft engine of an aircraft, comprising: supplying lubricant to the aircraft engine from an engine lubricant tank; feeding lubricant to the engine lubricant tank from an auxiliary lubricant tank, and concurrently moving lubricant out of the engine lubricant tank from a design lubricant level of the engine lubricant tank to the auxiliary lubricant tank at a greater flowrate than said feeding.

In some embodiments, the supplying, the feeding, and the moving steps are executed during flight of the aircraft, and the feeding is at a greater flowrate than a rate of consumption of lubricant from the lubrication system by the aircraft engine.

In some embodiments, the design lubricant level is below an overfill level of the engine lubricant tank when the aircraft is stationary on a runway in an upright orientation and the feeding and the moving step is executed at least intermittently during flight of the aircraft.

DESCRIPTION OF THE DRAWINGS

Reference is now made to the accompanying figures in which.

DETAILED DESCRIPTION

The present technology is illustrated with respect to an aeronautical internal combustion engine 10 of an aircraft 10A. In the embodiment shown in FIG. 1, the aeronautical internal combustion engine 10 is a turboshaft engine 10. In other embodiments, the aeronautical internal combustion engine 10 is a turbofan engine. In yet other embodiments, the aeronautical internal combustion engine 10 is a rotary engine. It is contemplated that the present technology can be applied to other types of aircraft engines as well. The aircraft 10A may be a rotorcraft or an airplane for example.

For the purposes of the present description, the term "conduit" is used to describe an arrangement of one or more elements, such as one or more hoses, pipes, tubing, connectors and/or other elements, that together form a flow path or flow paths for a liquid to flow from point A to point B. For example, a given conduit may be defined by any number and combination of hoses hydraulically interconnected in parallel and/or series, by or with one or more filters, switches, pumps, and the like, to provide for the function(s) of the given conduit and/or the particular embodiment of the engine that the given conduit is used with, for example.

Figure 1:
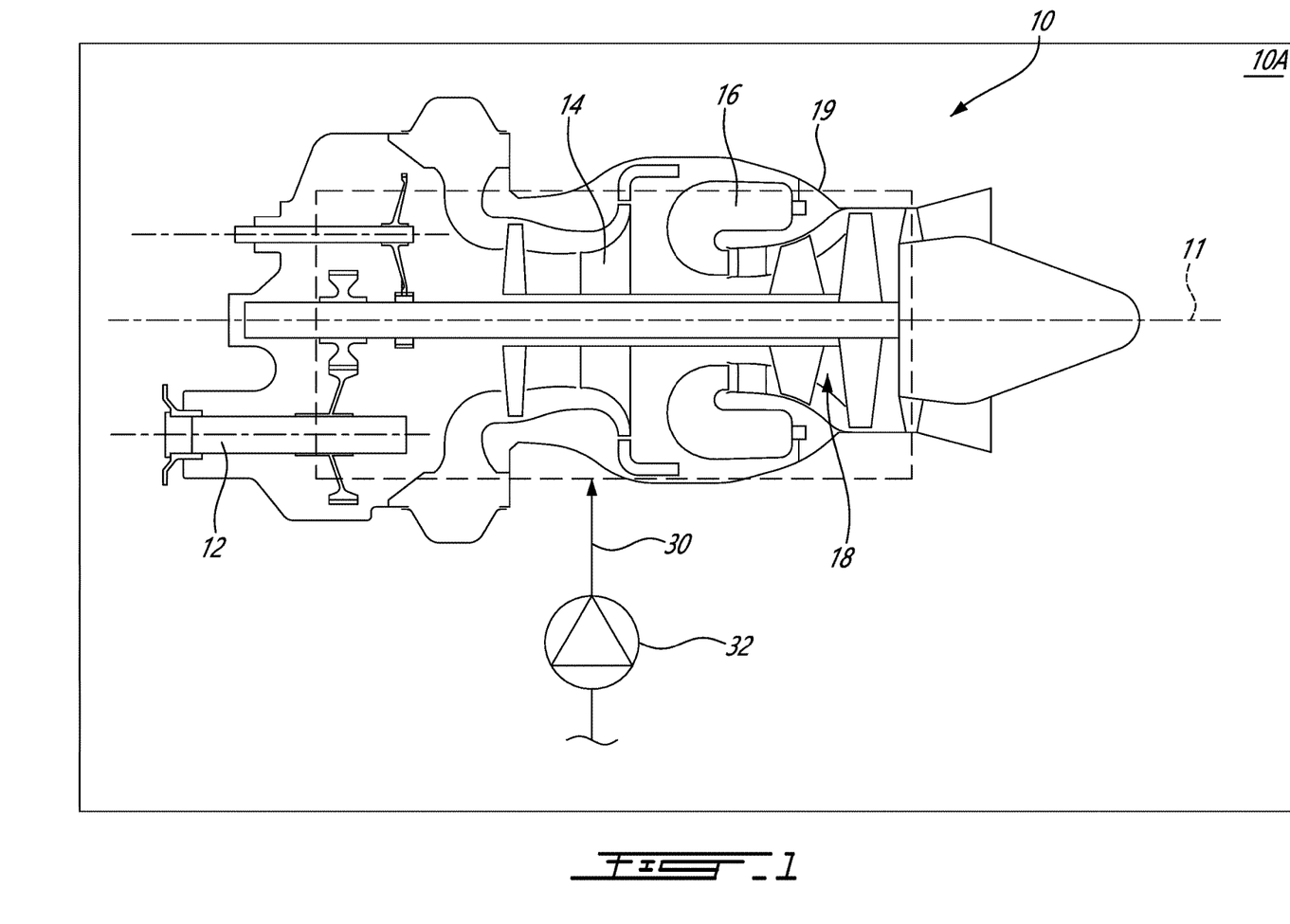
FIG. 1 is a schematic showing an aeronautical turboshaft engine and a supply pump supplying lubricant to parts of the engine.

Referring to FIG. 1, in the present non-limiting embodiment, the engine 10 comprises in serial flow communication a shaft 12 for driving a rotor, such as a rotor of the aircraft 10A for example, a compressor section 14 for pressurizing ambient air, a combustion chamber 16 in which the compressed air is mixed with fuel and ignited for generating an annular stream of hot combustion gases, and a turbine section 18 for extracting energy from the combustion gases. Components of the engine 10 are rotatable about a longitudinal center axis 11 of the engine 10. In other embodiments, the engine 10 may be a gas turbine engine such as a turbofan or a turboprop engine for example.

Figure 2:
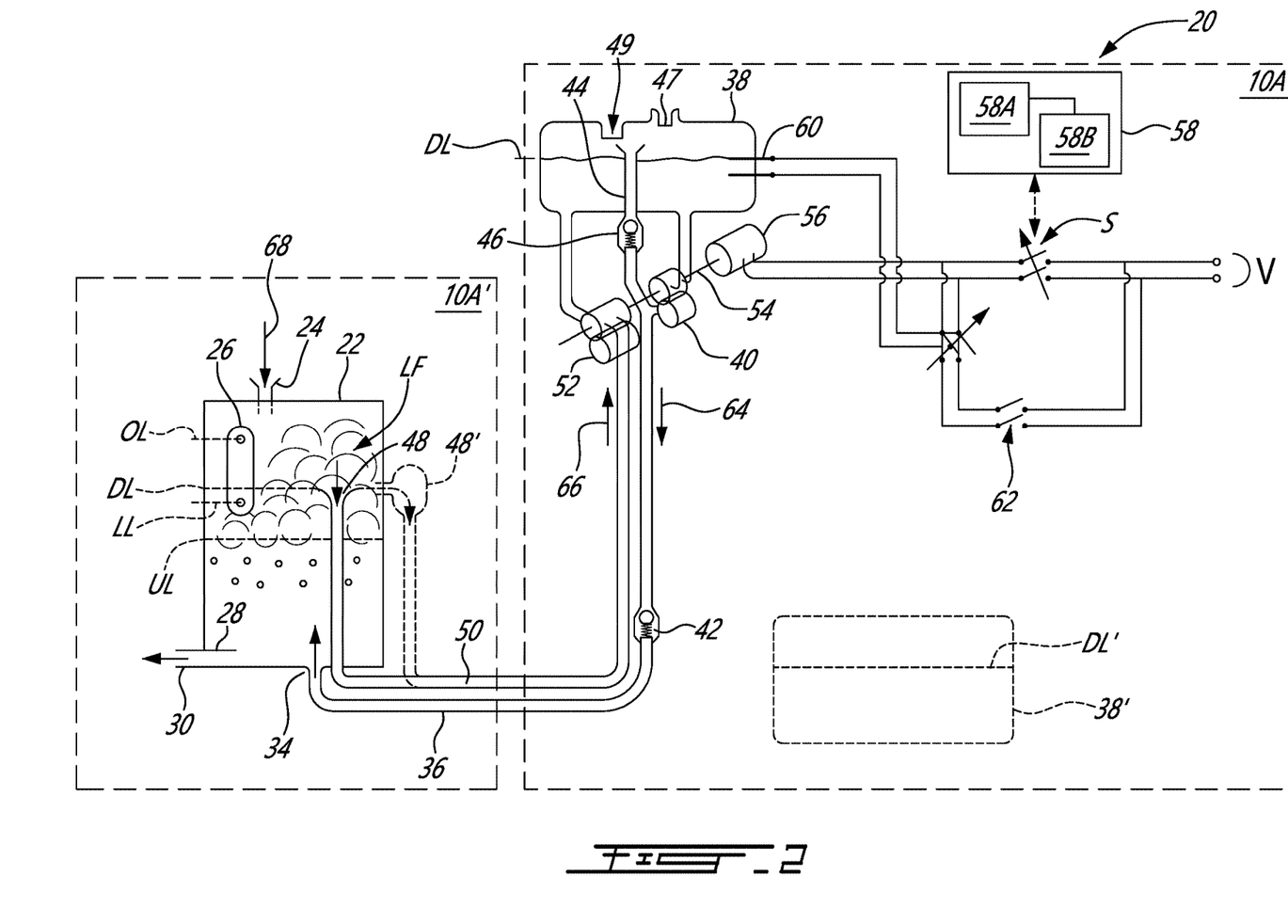
FIG. 2 is a schematic showing a lubrication system providing lubricant to the supply pump of FIG. 1.

In each given embodiment of the engine 10, various parts of the engine 10, such as bearing(s) for example, need to be lubricated. To this end, the engine 10 may define any suitable lubricant conduit network 19 which may deliver lubricant, such as an oil, to the various parts of the engine 10. The lubricant conduit network 19 may be conventional and is therefore not described herein in detail. Referring now to FIG. 2, in this embodiment, a lubrication system 20 supplies lubricant to various parts of the engine 10, by providing the lubricant to the lubricant conduit network 19. In some embodiments in which the aircraft 10A includes multiple engines 10, the lubrication system 20 may supply one or more of, and in some embodiments all of, the aircraft engines 10, though this only an option.

As shown in FIG. 2, the lubrication system 20 in the present embodiment includes an engine lubricant tank 22 that contains lubricant, such as oil for example. The engine lubricant tank 22 includes a filling port 24 via which the engine lubricant tank 22 may receive the lubricant for filling the engine lubricant tank 22 for example during servicing of the aircraft 10A. The filling port 24 may be any suitable filling port and may be fluidly sealable in any suitable way, such as by a cap (not shown) for example. To this end, the engine lubricant tank 22 and the filling port 24 may be located in an accessible part 10A' of the aircraft 10A, such as under an openable cowl of the engine 10 for example. A sight glass 26 (FIG. 2) may optionally be defined through a wall of the engine lubricant tank 22 and allows service personnel to view lubricant level in the engine lubricant tank 22 from outside the engine lubricant tank 22. The filling port 24 in FIG. 2 is oriented at least partially upright and optionally above a top level of the engine lubricant tank 22 or design lubricant level, relative to an upright orientation of the aircraft 10A, equivalent to having the aircraft 10A being parked on the ground. Accordingly, oil received via the filling port 24 may flow into the engine lubricant tank 22 by gravity. In some embodiments, particularly those which may have one or more prior art aircraft oil tanks/systems retrofitted along the lines of the present description for example, the filling port 24 may be conventional.

The engine lubricant tank 22 may have a design lubricant level DL, which may be selected to suit each particular embodiment of the engine 10 and the aircraft 10A so as to provide suitable lubrication to the parts of the engine 10. As shown in FIG. 2, the design lubricant level DL may be below an overfill lubricant level OL of the engine lubricant tank 22 and above a low lubricant level LL of the engine lubricant tank 22. The sight glass 26 in this embodiment is positioned such that the design lubricant level DL passes through the sight glass 26, the overfill lubricant level OL passes through a top portion of the sight glass 26, and the low lubricant level LL passes through a bottom portion of the sight glass 26, although other positioning may be used. In some embodiments, the sight glass 26 may be omitted. In embodiments where the oil is refilled through the auxiliary tank rather than the engine lubricant tank 22, the sight glass may be located on the auxiliary lubricant tank 38 instead or in addition to the engine lubricant tank 22.

Still referring to FIG. 2, in some embodiments, and depending on the particular embodiment and application, the engine lubricant tank 22 may also have a usable lubricant level UL which is below the design lubricant level DL. The usable lubricant level UL may be a level above which lubricant in the engine lubricant tank 22 may be less than optimal for supply to the engine 10, for example due to foaming that may occur in that part of the engine lubricant tank 22 during use. Foamy lubricant, or simply lubricant foam that may be present in some applications and operating conditions in an upper portion of the engine lubricant tank 22 above the usable lubricant level UL and above the design lubricant level DL, is shown at LF in FIG. 2.

To help avoid supplying such lubricant to the engine 10, the engine lubricant tank 22 includes a supply port 28 that is defined in a bottom of the engine lubricant tank 22, again relative to the upright orientation of the aircraft 10A. Other suitable locations of the supply port 28 that provide for similar functionality depending on the particular embodiment and shape of the engine lubricant tank 22 for example, may be also used. In some embodiments, and depending on any filtering and de-aeration systems that may be used for example, other locations of the supply port 28 may be in any other location below the usable lubricant level UL.

The supply port 28 is hydraulically connected to the parts of the engine 10 to be lubricated, and more particularly to the lubricant conduit network 19 in this embodiment, via a supply conduit 30. As shown in FIG. 1, in this embodiment, the supply conduit 30 includes a pump 32 that is operable to supply lubricant from the engine lubricant tank 22 to the parts. Due to its supply function from the lubrication system 20 to the engine 10, the pump 32 is hereinafter referred to as the "supply pump 32".

The supply pump 32 may be any suitable pump, or multiple pumps in series and/or parallel, selected to suit each particular embodiment of the engine 10, the aircraft 10A and the lubrication system 20. The term "supply pump 32" includes any such suitable arrangement. The supply pump 32 may be operated in any suitable way and using any suitable controls, to provide a sufficient flow and pressure of lubricant to the lubricant conduit network 19 (FIG. 1) and hence to the various parts of the engine 10 requiring the lubricant. A rest of the supply conduit 30 may be defined in any suitable way. Although not shown, in some embodiments the lubrication system 20 may include a return lubricant conduit which may return/recirculate lubricant from the lubricant conduit network 19 to one or more points in the lubrication system 20, such as for example into the engine lubricant tank 22 for example. In such embodiments any suitable lubricant return/recirculation conduit may be used. In some such embodiments, the lubricant return/recirculation conduit may include one or more return pumps for carrying out the return/recirculation functionality. Hence, the supply conduit 30 and/or the lubricant return/recirculation conduit (where present) may include one or more filters, valves, manifolds, and/or any other suitable parts which may be selected to suit each particular embodiment of the engine 10, the aircraft 10A and the lubrication system 20. Such elements may be conventional.

During operation of the engine 10, such as for example when the aircraft 10A is idle, or executing a take-off, cruise, or landing segments of a flight, the engine 10 may consume some of the lubricant supplied to it from the engine lubricant tank 22. At the various operating conditions, the engine 10 may have one or more different expected lubricant consumption rates. For making up for at least some of this lubricant consumption, and in some embodiments for all of this lubricant consumption depending on the embodiment of and the particular control strategy used to operate the lubrication system 20, the engine lubricant tank 22 includes a lubricant makeup port 34.

The lubricant makeup port 34 is disposed in the bottom of the engine lubricant tank 22 in this embodiment, but other suitable locations may also be used. For example, in some embodiments the lubricant makeup port 34 may be defined in a top of the engine lubricant tank 22. A lubricant makeup conduit 36 hydraulically connects the lubricant makeup port 34 to an auxiliary lubricant tank 38.

In the present embodiment, the auxiliary lubricant tank 38 does not have a filling port for filling it directly and is located in an inaccessible part 10A" of the aircraft 10A, such as under a non-openable part of the engine 10 or in the aircraft 10A remote to the engine 10 for example. In other embodiments, the auxiliary lubricant tank 38 may have a filling port (not shown) for filling it directly and/or may be located in an accessible part of the aircraft 10A, such as the accessible part 10A' for example.

The lubricant makeup conduit 36 includes a pump 40 operable to move lubricant from the auxiliary lubricant tank 38 to the engine lubricant tank 22 via the lubricant makeup port 34. Due to its supply function, the pump 40 is hereinafter referred to as the "lubricant makeup pump 40". The lubricant makeup pump 40 may be any suitable pump, or multiple pumps in series and/or parallel, selected to suit each particular embodiment of the engine 10, the aircraft 10A and the lubrication system 20. In some embodiments, the lubricant makeup pump 40 may be a fixed displacement pump as shown schematically in FIG. 2. More particularly, in some embodiments, the lubricant makeup pump 40 may be a gear pump, a gerotor pump, or a piston/plunger pump such as a fixed stroke piston/plunger pump. It is contemplated that lubricant makeup pump 40 may be multiple pumps of one or more different types selected to provide the functionality of the lubricant makeup pump 40 as described herein. The term "lubricant makeup pump 40" includes any such suitable arrangement. A non-limiting embodiment of the lubricant makeup pump 40 may be a gear pump as shown schematically in FIG. 2.

The lubricant makeup conduit 36 may be defined in any suitable way. For example, the lubricant makeup conduit 36 may include one or more filters, valves, manifolds, and/or any other suitable parts which may be selected to suit each particular embodiment of the engine 10, the aircraft 10A, and the lubrication system 20. In this embodiment, the lubricant makeup conduit 36 includes a check valve 42 disposed fluidly between the lubricant makeup pump 40 and the lubricant makeup port 34. The check valve 42 is oriented to allow lubricant flow through the check valve 42 toward the lubricant makeup port 34 and to prevent lubricant flow from the lubricant makeup port 34 past the check valve 42. In some embodiments, the check valve 42 may be omitted.

Further in this embodiment, a pressure relief conduit 44 fluidly connects the auxiliary lubricant tank 38 to the lubricant makeup conduit 36 at a location that is fluidly between the lubricant makeup pump 40 and the lubricant makeup port 34. The pressure relief conduit 44 includes a pressure relief and check valve 46 therein, which is configured to open when a pre-determined pressure threshold is reached inside the engine lubricant tank 22, so as to relieve any undesirable pressure buildup that may occur in the auxiliary lubricant tank 38 into the engine lubricant tank 22. In some embodiments, the auxiliary lubricant tank 38 also includes a pressure relief valve 47 in a top of the auxiliary lubricant tank 38, which may be configured to open to another space/volume, such as for example a gearbox of the engine 10/aircraft, when the pre-determined pressure threshold is reached inside the auxiliary lubricant tank 38.

In the present embodiment, the auxiliary lubricant tank 38 further includes a vacuum relief valve 49 which in this embodiment is in the top of the auxiliary lubricant tank 38. The vacuum relief valve 49 is configured to open to the other volume/space, which may be a gearbox in some embodiments as mentioned above, when pressure in the auxiliary lubricant tank 38 falls below a pre-determined pressure threshold, so as to prevent any undesirable pressure drop that may occur in the auxiliary lubricant tank 38. The pre-determined pressure thresholds associated with the valves 46, 47 may be selected to suit each particular embodiment and application of the engine 10, the aircraft 10A and the lubrication system 20. In some embodiments, the pressure relief and check valve 46 and/or the pressure relief valve 47 and/or vacuum relief valve 49 may be omitted. In some such embodiments, one or more other pressure regulating mechanism(s) may be used.

As shown in FIG. 2, the engine lubricant tank 22 in this embodiment further includes an overfill port 48 which is vertically offset from the supply port 28. The overfill port 48 is disposed at the design lubricant level DL of the engine lubricant tank 22, the design lubricant level DL being above the bottom of the engine lubricant tank 22. In the present embodiment, the overfill port 48 is disposed inside the engine lubricant tank 22. In other embodiments, the overfill port 48 may be disposed at least in part outside of the engine lubricant tank 22. A non-limiting alternative embodiment of the overfill port, labeled as 48', is shown in dashed lines in FIG. 2. In the illustrated embodiment, a body of the overfill port 48' is disposed outside of the engine lubricant tank 22 and fluidly connects into the engine lubricant tank 22 at a point in a wall of the engine lubricant tank 22 located at the design lubricant level DL.

An overfill conduit 50 hydraulically connects the overfill port 48 to the auxiliary lubricant tank 38. In the present embodiment, the overfill conduit 50 connects into a bottom of the auxiliary lubricant tank 38, although a different location may be used. As seen in FIG. 2, the overfill conduit 50 in this embodiment is defined by, among other elements, a different lubricant line than the lubricant makeup conduit 36. The overfill conduit 50 is therefore different from the lubricant makeup conduit 36. In the present embodiment, the overfill conduit 50 includes a pump 52, referred to herein as the "scavenge pump 52" due to its function. The scavenge pump 52 is operable to move lubricant from the overfill port 48 to the auxiliary lubricant tank 38 via the overfill conduit 50. The scavenge pump 52 may be any suitable pump, or multiple pumps in series and/or parallel, selected to suit each particular embodiment of the engine 10, the aircraft 10A and the lubrication system 20. In some embodiments, the scavenge pump 52 may be a fixed displacement pump as shown schematically in FIG. 2. More particularly, in some embodiments, the scavenge pump 52 may be a gear pump, a gerotor pump, or a piston/plunger pump such as a fixed stroke piston/plunger pump. It is contemplated that scavenge pump 52 may be multiple pumps of one or more different types selected to provide the functionality of the scavenge pump 52 as described herein. The term "scavenge pump 52" includes any such suitable arrangement.

The scavenge pump 52 is configured to operate, and is thus operable, at a higher liquid lubricant flowrate than the lubricant makeup pump 40. In a particular non-limiting embodiment, the liquid lubricant flowrate of the scavenge pump 52 is about 2 times the liquid lubricant flowrate of the lubricant makeup pump 40. In some embodiments, the liquid lubricant flowrate of the scavenge pump 52 is between 1.1 and 3 times the liquid lubricant flowrate of the lubricant makeup pump 40. In some such embodiments, the liquid lubricant flowrate is the instantaneous liquid lubricant flowrate. In other embodiments, a different flow rate ratio may be used depending on the particular embodiment and application of the engine 10, the aircraft 10A and the lubrication system 20 for example. For the purposes of this document, the flowrate of a given pump is an effective flow rate over a given time period, and may be achieved using one or more different instantaneous flow rates and one or more different operating profiles (i.e. operating frequency and operating duration) of the given pump. For example, over a given flight time a given pump may be controlled to operate intermittently, a number of times at given respective operating durations, to move a given overall volume of lubricant. As another example, a relatively smaller sized pump may be used to move a same volume of lubricant over that flight time by being operated for example at a lower instantaneous flowrate but for a longer overall portion of the given flight time. Therefore in some embodiments the scavenge pump 52 may be sized to provide a larger instantaneous flowrate than the lubricant makeup pump 40. In other embodiments the scavenge pump 52 may be sized to provide an equal or lower instantaneous flowrate than the lubricant makeup pump 40.

A higher liquid lubricant flowrate of the scavenge pump 52 relative to the lubricant makeup pump 40 may provide one or more advantages in at least some applications. As an example, this configuration may help maintain the level of lubricant in the engine lubricant tank 22 at or proximate the design lubricant level DL by preventing or minimizing any rise in lubricant level in the engine lubricant tank 22 above the overfill port 48 during flight without relying on the presence or input of any lubricant level sensor(s) to this effect. Accordingly, in some such embodiments, where the application(s) of the lubrication system 20 may allow it, lubricant level sensor(s) to this effect may be omitted from at least the engine lubricant tank 22.

In other embodiments the scavenge pump 52 may not be configured to operate, and may not be operated, at a higher liquid lubricant flowrate than the lubricant makeup pump 40. As an example, this may be the case when a given embodiment of the lubrication system 20 is designed to be used solely when the aircraft 10A is on the ground and not necessarily during flight. In some such embodiments, the scavenge pump 52, where present, may be operable via one or more switches or appropriate controls sequences while the lubricant makeup pump 40 is off. In another aspect, the presence of the scavenge pump 52 may allow for relatively more flexibility in possible placement of the auxiliary lubricant tank 38 relative to the engine lubricant tank 22, by providing pumping energy which may help overcome gravity if the positioning is such as to require this.

In other embodiments, the engine lubricant tank 22 and the auxiliary lubricant tank 38 may be located relative to each other in the aircraft 10A, and/or the overfill conduit 50 may be selected to provide sufficiently low flow resistance, so as to allow lubricant to flow from the overfill port 48 into the auxiliary lubricant tank 38 by gravity when lubricant rises above the overfill port 48. Such embodiments may not require pumping energy for this function. In some such embodiments, the scavenge pump 52 may be omitted. As a non-limiting example, to allow for this functionality the auxiliary lubricant tank 38 may be disposed relative to the engine lubricant tank 22 such that the design lubricant level DL of the auxiliary lubricant tank 38 is below the design lubricant level DL of the engine lubricant tank 22 at least when the aircraft 10A" is stationed on horizontal tarmac for example. A non-limiting example of such a relative positioning of the auxiliary lubricant tank 38 is shown at 38' and DL' in FIG. 2.

In another aspect, in some embodiments the liquid lubricant flowrate of the lubricant makeup pump 40 may be selected to be at least equal to, and in some embodiments larger than, a total lubricant consumption rate that the engine(s) 10 fed by the lubrication system 20 may consume lubricant from the lubrication system 20 during a given flight time and/or operating time. As an example, in some embodiments, the liquid lubricant flowrate of the lubricant makeup pump 40 may be selected to be between 10% and 50% larger than the total lubricant consumption of the engine(s) 10. Yet other percent ranges may be used depending on a desired safety margin and engine embodiment for example. In some embodiments, the total lubricant consumption rate may be an effective lubricant consumption over a given flight time when the engine(s) 10 is/are new. In some embodiments, the total lubricant consumption rate may be a total effective lubricant consumption over a given flight time when the engine(s) 10 is/have been operated for at least a predetermined number of hours, at which point at least some embodiments of the engine(s) 10 may consume more lubricant than when the engine(s) 10 is/are new.

Such engine lubricant consumption rates may be calculated/simulated using conventional engineering techniques or may be obtained from the engine manufacturer(s) for example. Yet other types of the total lubricant consumption rate and/or other methods of selecting the total lubricant consumption rate may be used depending on the intended application(s) of the lubrication system 20. The predetermined number of hours, where used, may be selected to suit each particular embodiment of the engine(s) 10. For example, the predetermined number of hours may be selected as a length of operating life of the engine over which the lubrication system 20 is to ensure that at least the amount of lubricant that is consumed by the engine(s) 10 from the engine lubricant tank 22 during a given flight is made-up into the engine lubricant tank 22 from the auxiliary lubricant tank 38. The auxiliary lubricant tank 38 and the engine lubricant tank 22 may be sized appropriately to provide for such functionality.

Such configurations may help maintain the level of lubricant in the engine lubricant tank 22 at or proximate the design lubricant level DL by preventing or minimizing any drop in lubricant level in the engine lubricant tank 22 below the overfill port 48 during flight without relying on the presence or input of any lubricant level sensor(s) to this effect. Accordingly, in some such embodiments, where the application(s) of the lubrication system 20 may allow it, lubricant level sensor(s) to this effect may be omitted from at least the engine lubricant tank 22. Similar to the flowrate considerations described above with regard to the scavenge pump 52, the flowrate of the lubricant makeup pump 40 may be selected to be higher than the total engine lubricant consumption rate by selecting a corresponding instantaneous flowrate of the lubricant makeup pump 40 and a corresponding operating profile (i.e. operating frequency and operating duration) of the lubricant makeup pump 40 to provide the flowrate of the lubricant makeup pump 40. These characteristics and the pump 40 may be selected to suit each particular embodiment of the engine(s) 10 and the application(s) for which the lubrication system 20 may be designed.

Referring to FIG. 2, in the present embodiment and although this need not be the case in other embodiments, the lubricant makeup pump 40 and the scavenge pump 52 are operatively connected to a common shaft 54. The common shaft 54 is in turn operatively connected to a motor 56. The motor 56 is therefore drivable to simultaneously operate both the lubricant makeup pump 40 and the scavenge pump 52, at the same speed. In an aspect, this construction may help simplify the lubrication system 20 and/or reduce a number of parts associated therewith.

In other embodiments, the lubricant makeup pump 40 and the scavenge pump 52 where both present, may be independently operable and/or may be operable at different and/or variable rotational speeds using any suitable corresponding control hardware. For example, the lubricant makeup pump 40 and/or the scavenge pump 52 may be operatively connected to any suitable one or more actuators to be driven by the one or more actuators, which may include variable frequency drives for example. In some embodiments, the pump(s) 40, 52 may be operatively connected to an accessory gearbox of the engine 10 from the accessory gearbox. In some embodiments, the one or more actuators may be integrated into the respective one(s) of the lubricant makeup pump 40 and/or the scavenge pump 52.

When both the lubricant makeup pump 40 and the scavenge pump 52 operate: a) lubricant flows from the auxiliary lubricant tank 38 into the engine lubricant tank 22 via the lubricant makeup port 34, and at the same time, b) fluid flows from the engine lubricant tank 22 via the overfill port 48 into the auxiliary lubricant tank 38. Fluid entering the overfill port 48 may include for example air and/or foamy lubricant and/or liquid lubricant from the portion of the engine lubricant tank 22 proximate to and above the overfill port 48. In the present embodiment, the scavenge pump 52 having a higher associated liquid lubricant flowrate than the lubricant makeup pump 40 helps ensure that any excess lubricant that may enter or be otherwise present in the engine lubricant tank 22 will be moved out of the engine lubricant tank 22 via the overfill port 48 without allowing the level of lubricant in the engine lubricant tank 22 to rise above the design lubricant level DL thereof.

Controls aspects associated with the lubrication system 20 are described next. As shown in FIG. 2, the motor/actuator 56 is operatively connected to a power source V selected to suit the particular embodiment of the motor/actuator 56. In this embodiment and not necessarily the case in other embodiments, the motor/actuator 56 is electric. Therefore, in this embodiment the power source V is electric. It is contemplated that in other embodiments the motor/actuator 56 and the power source may be hydraulic or pneumatic for example. In some such embodiments, associated corresponding different controls may be used to provide for the functionality described herein. For example, the lubrication system 20 may be powered directly or indirectly by the gas turbine engine 10.

In this embodiment, the motor/actuator 56 is connected to the power source V via a controller 58. In the present embodiment, the controller 58 includes a processor 58A and a non-transient memory 58B in communication with the processor 58A and storing thereon instructions executable by the processor 58A. The instructions may be programmed into the non-transient memory 58B for example using conventional programming techniques such that, when executed by the processor 58A, they cause the controller 58 to provide for the functionality of the controller 58 described herein. In some embodiments, the controller 58 may be connected to a normally-open switch S for example, and may be configured to actuate the switch S, at a pre-determined frequency for a pre-determined duration, from its normally-open position in which the switch S disconnects the motor/actuator 56 from the power source V to a closed position in which the switch S connects the motor/actuator 56 to the power source V and thus operates the motor/actuator 56. In some embodiments, the switch S may be part of a controller of the motor/actuator 56 for example. In some embodiments, the controller 58 may be a conventional timer, such as a normally-open timer and/or a timer connected to the normally-open switch S to provide for similar functionality as described above with respect to the controller 58. Hence, in some embodiments the controller 58 may not have a processor or memory. It is contemplated that any suitable controller and/or control and/or actuation arrangement may be used to provide for the functionality described herein.

The pre-determined frequenc(ies) and the duration(s) may be selected to suit each particular embodiment of the engine 10, the aircraft 10A and the lubrication system 20. As an example, in some embodiments the pre-determined frequency may be 5 minutes, and the pre-determined duration may be 1 minute, meaning that the controller 58 would activate the pumps 40 and 52 for 1 minute every 5 minutes. This is a non-limiting example in which the pump(s) 40, 52 may be configured to operate at least intermittently during flight of the aircraft 10A.

For at least some applications, the pre-determined frequency and pre-determined duration may be selected based on the flowrates of the pump(s) 40, 52 so as to add lubricant from the auxiliary lubricant tank 38 to the engine lubricant tank 22 at a lubricant makeup rate that exceeds an expected lubricant consumption rate of the engine(s) 10 to which lubricant is provided from the engine lubricant tank 22. In some embodiments, the expected lubricant consumption rate may be chosen as an average expected lubricant consumption rate associated with the engine(s) 10 to which lubricant is provided from the engine lubricant tank 22, averaged over a given flight of the aircraft 10A for example.

In some embodiments, the controller 58 may be programmable so as to allow to set a particular rate of lubricant makeup rate for a given type of mission for example. The controller 58 may be digital or analog. The controller 58 is an example of a controller 58 that may be used to control operation of the lubrication system 20 as described in this document for example. In other embodiments, a different controller may be used to provide for the functionality of the lubrication system 20 as described herein, and/or to execute other control sequences with respect to the lubrication system 20.

As an example, in other embodiments the controller 58 may have a processor coupled to non-transient memory storing instructions thereon which, when executed by the processor, cause the processor to control the lubrication system 20 as described herein. In some embodiments, for example a controller of the engine(s) 10 (e.g. engine EEC) may be used instead of the controller 58.

Still referring to FIG. 2, further in the present embodiment the lubrication system 20 includes a level switch 60. The level switch 60 is operatively connected to the auxiliary lubricant tank 38 to change states (open/closed) when lubricant level in the auxiliary lubricant tank 38 moves below or above a design lubricant level DL associated with the auxiliary lubricant tank 38. In this embodiment the level switch 60 is open when lubricant in the auxiliary lubricant tank 38 is above the design lubricant level DL associated with the auxiliary lubricant tank 38, and closed while lubricant in the auxiliary lubricant tank 38 is below the design lubricant level DL associated with the auxiliary lubricant tank 38.

The level switch 60 may be any suitable level switch, such as the electrical contact switch shown in FIG. 2, a float-actuated switch, an optical sensor, and the like. In some embodiments the level switch 60 may be omitted, such as for example in embodiments in which the auxiliary lubricant tank 38 may be positioned in the accessible part 10A' of the aircraft 10A and in which it may include a filling port (not shown) for filling it directly during maintenance of the aircraft 10A.

The level switch 60 is operatively connected to a maintenance switch 62. The maintenance switch 62 in this embodiment is a manually operable conventional switch and is positioned in the accessible part 10A' of the aircraft 10A. In other embodiments, the maintenance switch 62 may be a remotely operable conventional switch for example. In the particular configuration of the level switch 60 of the present embodiment, the maintenance switch 62 is operable to turn the pump(s) 40, 52 on while lubricant in the auxiliary lubricant tank 38 is below the design lubricant level DL associated with the auxiliary lubricant tank 38.

During a maintenance operation for example, activating the pump(s) 40, 52 allows filling the auxiliary lubricant tank 38 from the engine lubricant tank 22 by adding lubricant into the engine lubricant tank 22 to a level of lubricant in the engine lubricant tank 22 that is at or above the overfill port 48 such that liquid lubricant feeds the overfill port 48. In this scenario, in embodiments where both pumps 40, 52 are present, the scavenge pump 52 operates at a higher liquid flow rate than the lubricant makeup pump 40, thereby creating a net positive flow into the auxiliary lubricant tank 38 at least while the level of liquid lubricant is sufficiently high in the engine lubricant tank 22 to be drawn into the overfill port 48. In this scenario, in embodiments where the scavenge pump 52 is not present, the auxiliary lubricant tank 38 and the overfill conduit 50 are positioned/configured for adding lubricant into the engine lubricant tank 22 to a level of lubricant in the engine lubricant tank 22 that is at or above the overfill port 48 allows gravity to carry this lubricant into the auxiliary lubricant tank 38 via the overfill port 48.

On the other hand, activating the pump(s) 40, 52 may also allow filling the engine lubricant tank 22 from the auxiliary lubricant tank 38 where the level of lubricant in the engine lubricant tank 22 is lower than the overfill port 48 and the auxiliary lubricant tank 38 contains lubricant. This method of filling may be executed during flight for example. When lubricant in the engine lubricant tank 22 is or drops below the overfill port 48, the engine lubricant tank 22 gets filled with liquid lubricant from the auxiliary lubricant tank 38 via operation of the lubricant makeup pump 40. In some embodiments, at the same time foam F that may be present and/or created from lubricant in the engine lubricant tank 22 proximate to or above the overfill port 48 may be drawn into the overfill port 48 either by gravity and/or by the scavenge pump 52, and may thereby be removed from the engine lubricant tank 22. In this operational state, due to the lower density of lubricant foam that may be ingested into the overfill port 48 as compared to the density of liquid lubricant, the mass flow of lubricant into the engine lubricant tank 22 via the lubricant makeup pump 40 may be greater than a mass flow of lubricant out the engine lubricant tank 22 via the scavenge pump 52, thereby creating a net flow of lubricant from the auxiliary lubricant tank 38 to the engine lubricant tank 22 in such embodiments.

When the level of liquid lubricant in the engine lubricant tank 22 reaches the overfill port 48, the higher liquid lubricant flowrate provided by the scavenge pump 52 and/or gravity drain via the overfill port 48 exceeds the lower liquid lubricant flowrate provided by the lubricant makeup pump 40. Thus, after this point, the mass flow of lubricant out the engine lubricant tank 22 via the scavenge pump 52 will be at least equal to or greater than the mass flow of lubricant into the engine lubricant tank 22 via the lubricant makeup pump 40. The level of lubricant will therefore not rise above and may be maintained at the level of the overfill port 48 after having reached the level of the overfill port 48.

With the above structure in mind, and referring to FIG. 2, the present technology provides a method of operating a lubrication system, such as the lubrication system 20, of an aircraft engine 10 of an aircraft 10A. According to one embodiment, the method includes a step, shown with arrow 64, of moving lubricant, such as oil, to an engine lubricant tank supplying lubricant to the aircraft engine 10A, such as the engine lubricant tank 22 in the embodiment shown in FIG. 2. As seen above, the step 64 may be executed by operating a pump, such as the lubricant makeup pump 40. Also as seen above, the lubricant may be moved into the engine lubricant tank 22 from an auxiliary lubricant tank of the aircraft 10A, such as the auxiliary lubricant tank 38.

Still referring to FIG. 2, in some embodiments, the method also includes a step, shown with arrow 66, of moving lubricant from a point at a design lubricant level DL in the engine lubricant tank 22 to the auxiliary lubricant tank 38. As seen above, in some cases the point may be defined by an overfill port 48, such as the overfill port 48 and/or the overfill port 48'. In some embodiments, the step 66 may be executed while step 64 is being performed. In other embodiments, the steps 64 and 66 may be executed in one or more different sequences, and may or may not overlap in time. As seen above, in some embodiments step 66 may be performed by operating a scavenge pump, such as the scavenge pump 52. Also as seen above, in some embodiments step 66 may be performed by gravity and without having to operate a pump in addition to the lubricant makeup pump 40.

In some embodiments, the steps 64 and 66 may be performed intermittently or continuously during operation of the aircraft 10A, such as during idling and/or flight for example. In some such cases, the flow rate provided by the steps 64 and 66 may be selected to match or exceed an expected lubricant consumption rate of the engine(s) 10 being fed from the engine lubricant tank 22. In some embodiments, the selected expected lubricant consumption rate to be matched or exceeded may be selected to be a maximum total expected lubricant consumption rate of the engine(s) 10.

In some embodiments, the flow rates and/or the control sequence(s) of the pump(s) 40, 52 may be selected such that the pump(s) 40, 52 is/are operable to move a quantity of lubricant from the auxiliary lubricant tank 38 to the engine lubricant tank over 22 a time period during flight, such as over an entirety of the flight in some applications, which quantity is at least equal to a maximum expected quantity of lubricant to be consumed by the aircraft engine 10 over the time period.

In some embodiments and applications, executing the steps 64 and 66 at least intermittently during flight may allow the level of lubricant in the engine lubricant tank 22 to be maintained at or at least close to the design lubricant level DL during operation of the aircraft 10A, by making up for lubricant consumption of the engine(s) 10 with lubricant from the auxiliary lubricant tank 38.

During such operation, the level of lubricant may gradually decrease in the auxiliary lubricant tank 38 as a function of the lubricant consumption rate of the engine(s) 10. In another aspect, this method may also help remove at least some foamy or aerated lubricant from a proximity of a point (e.g. overfill port 48 and or 48') at which lubricant is withdrawn from the engine lubricant tank 22 for return to the auxiliary lubricant tank 38. In yet another aspect, this method may also remove a need for the engine lubricant tank 22 to have lubricant level sensors or switches. This may allow a simplification of the construction of the engine lubricant tank 22.

Still referring to FIG. 2, the present technology also provides a method of maintaining a lubrication system of an aircraft 10A. The maintenance method may include, while the aircraft 10A is stationed for maintenance, adding lubricant directly into an engine lubricant tank that during operation supplies lubricant to the aircraft engine 10A, such as the engine lubricant tank 22. This step is shown with arrow 68.

In some cases, the step 68 of adding lubricant may include filling the engine lubricant tank 22 via the filling port 24 thereof to a point above the design lubricant level DL of the engine lubricant tank 22 and moving lubricant out of the engine lubricant tank 22 into an auxiliary lubricant tank of the aircraft 10A, such as the auxiliary lubricant tank 38, via an overfill conduit 50 as shown with arrow 66 in FIG. 2. As seen above, the step 66 may be executed by gravity in some embodiments where the tanks 22, 38 are accordingly positioned relative to one another, and/or by operating a pump, such as the scavenge pump 52.

In the maintenance method, the steps 66 and 68 may be executed until the auxiliary lubricant tank 38 is filled to its design lubricant level DL, from the engine lubricant tank 22. As seen above, in some embodiments, the steps 66 and 68 may be executed by turning on a maintenance switch, such as the maintenance switch 62, which may be operatively connected to operate at least the lubricant makeup pump 40.

In an aspect, this maintenance method may allow personnel servicing the aircraft 10A to avoid having to access the auxiliary lubricant tank 38. This, in turn, may allow for more flexibility in designing the aircraft 10A, and more particularly may allow the auxiliary lubricant tank 38 to be installed in locations that are difficult to access or inaccessible during regular maintenance.

In some embodiments, the maintenance method may include stopping circulation of lubricant between the engine lubricant tank 22 and the auxiliary lubricant tank 38 automatically in response to determining that lubricant in the auxiliary lubricant tank 38 reached the design lubricant level DL of the auxiliary lubricant tank 38. As seen in FIG. 2, in some non-limiting embodiments this step may be executed using a level switch 60 operatively connected to the pump(s) 40, 52. It is contemplated that any other suitable feedback mechanism may be used in addition to or instead of the level switch 60.

Any suitable materials, construction and manufacturing methods could be used to construct and configure the systems as described above. The materials, construction and manufacturing methods may be selected to suit each particular embodiment and application of the systems. The above description is meant to be exemplary only, and one skilled in the art will recognize that changes may be made to the embodiments described without departing from the scope of the technology disclosed.

For example, in some embodiments one or more lubricant level sensors may be present with respect to one or both of the tanks 22, 38 and may be configured to monitor when for example an lubricant level in the engine lubricant tank 22 drops below and/or rises above the overfill port 48. In some such embodiments, the sensor(s) may be connected, directly or indirectly to the pump(s) 40, 52, such as via one or more suitable controller(s), and the controller(s) may be configured to activate the pump(s) 40, 52, and in some embodiments at least the lubricant makeup pump 40 to regulate the lubricant level to be at or proximate the overfill port 48 for example. As another non-limiting example, in some embodiments the tank 22 and/or the tank 38 may be multiple tanks suitably interconnected to provide for the functionality described herein.

The invention claimed is:

1. A lubrication system for an aircraft engine, comprising:
an engine lubricant tank including at least a supply port hydraulically connectable to the aircraft engine, a lubricant makeup port, and an overfill port;
an auxiliary lubricant tank;
a lubricant makeup conduit hydraulically connecting the auxiliary lubricant tank to the lubricant makeup port, the lubricant makeup conduit including a pump operable to move lubricant from the auxiliary lubricant tank to the lubricant makeup port; and
an overfill conduit hydraulically connecting the overfill port to the auxiliary lubricant tank.

2. The lubrication system of claim 1, wherein the supply port is in the bottom of the engine lubricant tank.

3. The lubrication system of claim 1, wherein the lubricant makeup port is in at least one of: the bottom of the engine lubricant tank, and a top of the engine lubricant tank.

4. The lubrication system of claim 3, wherein the lubricant makeup port is in the bottom and further comprising a check valve in the lubricant makeup conduit, the check valve oriented to allow lubricant flow through the check valve toward the lubricant makeup port and to prevent lubricant flow from the lubricant makeup port past the check valve.

5. The lubrication system of claim 1, wherein the auxiliary lubricant tank includes at least one of: a pressure relief valve, and a vacuum relief valve.

6. The lubrication system of claim 1, wherein the pump is a lubricant makeup pump and the overfill conduit includes a scavenge pump operable to move lubricant from the overfill port to the auxiliary lubricant tank via the overfill conduit.

7. The lubrication system of claim 6, wherein the scavenge pump is configured to operate at a higher liquid lubricant flowrate than the lubricant makeup pump.

8. The lubrication system of claim 7, wherein the lubricant makeup pump is operatively connected to a motor and the scavenge pump is operatively connected to the common motor, the motor drivable to simultaneously operate both the lubricant makeup pump and the scavenge pump.

9. The lubrication system of claim 8, wherein the lubricant makeup pump is a first fixed displacement pump and the scavenge pump is a second fixed displacement pump.

10. The lubrication system of claim 1, wherein the engine lubricant tank has a design lubricant level and the overfill port is disposed at the design lubricant level.

11. An aircraft, comprising:
an aircraft engine connected to the aircraft; and
a lubrication system operatively connected to the aircraft engine to lubricate parts of the aircraft engine, the lubrication system including:
an engine lubricant tank hydraulically connected to the aircraft engine;
an auxiliary lubricant tank,
a lubricant makeup conduit hydraulically connecting the auxiliary lubricant tank to the engine lubricant tank, the lubricant makeup conduit including a pump operable to move lubricant from the auxiliary lubricant tank to the engine lubricant tank via the lubricant makeup conduit, and
an overfill conduit hydraulically connecting the engine lubricant tank to the auxiliary lubricant tank.

12. The aircraft of claim 11, wherein the pump is operable to move a quantity of lubricant from the auxiliary lubricant tank to the engine lubricant tank over a time period during flight, the quantity being at least equal to a maximum expected quantity of lubricant to be consumed by the aircraft engine over the time period.

13. The aircraft of claim 12, wherein the engine lubricant tank has a design lubricant level and the overfill port is disposed at the design lubricant level.

14. The aircraft of claim 13, wherein:
the pump is a fixed displacement first pump;
the overfill conduit includes a fixed displacement second pump operable to move lubricant from the overfill port to the auxiliary lubricant tank via the overfill conduit.

15. The aircraft of claim 14, wherein the second pump configured to operate at a higher liquid lubricant flowrate than the first pump, and the first and second pumps are configured to operate at least intermittently during flight of the aircraft.

16. The aircraft of claim 11, comprising a controller operatively connected to the pump and configured to operate the pump during flight.

17. The aircraft of claim 11, wherein at least one of the engine lubricant tank and the auxiliary lubricant tank includes a filling port.

18. A method of operating a lubrication system of an aircraft engine of an aircraft, comprising:
supplying lubricant to the aircraft engine from an engine lubricant tank;
feeding lubricant to the engine lubricant tank from an auxiliary lubricant tank, and
concurrently moving lubricant out of the engine lubricant tank from a design lubricant level of the engine lubricant tank to the auxiliary lubricant tank at a greater flowrate than said feeding.

19. The method of claim 18, wherein:
the supplying, the feeding, and the moving steps are executed during flight of the aircraft, and
the feeding is at a greater flowrate than a rate of consumption of lubricant from the lubrication system by the aircraft engine.

20. The method of claim 18, wherein the design lubricant level is below an overfill level of the engine lubricant tank when the aircraft is stationary on a runway in an upright orientation and the feeding and the moving step is executed at least intermittently during flight of the aircraft.

* * * * *